(12) United States Patent
Kung

(10) Patent No.: US 9,398,807 B2
(45) Date of Patent: Jul. 26, 2016

(54) HOOK FOR CLOTHES HANGER

(71) Applicant: MERRIMACK RIVER PRECISION INDUSTRIAL CORPORATION, Taipei (TW)

(72) Inventor: Tsung-Ming Kung, Taipei (TW)

(73) Assignee: MERRIMACK RIVER PRECISION INDUSTRIAL CORPORATION (TW)

( * ) Notice: Subject to any disclaimer, the term of this patent is extended or adjusted under 35 U.S.C. 154(b) by 0 days.

(21) Appl. No.: 14/585,977

(22) Filed: Dec. 30, 2014

(65) Prior Publication Data

US 2016/0183678 A1 Jun. 30, 2016

(51) Int. Cl.
A47F 7/00 (2006.01)
A47G 29/00 (2006.01)
A47B 61/00 (2006.01)
F16B 2/12 (2006.01)
A47G 25/14 (2006.01)

(52) U.S. Cl.
CPC .......... *A47B 61/003* (2013.01); *A47G 25/1457* (2013.01); *F16B 2/12* (2013.01)

(58) Field of Classification Search
CPC ....... A45C 13/03; A45C 7/0027; A47G 25/54
USPC ........ 211/85.3, 124; 206/279, 291; 248/316.1
See application file for complete search history.

(56) References Cited

U.S. PATENT DOCUMENTS

| 227,982 | A | * | 5/1880 | Larson | 54/63 |
| 1,760,290 | A | * | 5/1930 | Tammarazzo | 211/85.3 |
| 2,920,369 | A | * | 1/1960 | Zezula | 24/490 |
| 4,769,878 | A | * | 9/1988 | Liao | 24/535 |
| 5,320,228 | A | * | 6/1994 | Chen | 211/124 |
| 5,531,335 | A | * | 7/1996 | Chen | 211/124 |
| 5,558,383 | A | * | 9/1996 | Lancellotti | 294/143 |
| 5,582,377 | A | * | 12/1996 | Quesada | 248/229.12 |
| 5,584,462 | A | * | 12/1996 | Reese | 248/477 |
| 5,794,905 | A | * | 8/1998 | Richter | 248/316.4 |
| 5,944,178 | A | * | 8/1999 | Mao | 206/289 |
| 6,131,864 | A | * | 10/2000 | Schumann | 248/205.3 |
| 6,591,950 | B1 | * | 7/2003 | Scicluna | 190/103 |
| 6,595,354 | B1 | * | 7/2003 | Scicluna | 206/279 |
| 6,666,425 | B1 | * | 12/2003 | Ferguson | 248/477 |
| 7,201,357 | B2 | * | 4/2007 | Price et al. | 248/477 |
| 7,578,492 | B2 | * | 8/2009 | Darre' | 248/477 |
| 7,681,851 | B1 | * | 3/2010 | Osterholt et al. | 248/308 |
| 8,757,570 | B2 | * | 6/2014 | Ernst et al. | 248/304 |
| 2006/0060748 | A1 | * | 3/2006 | Darre | 248/476 |
| 2006/0124418 | A1 | * | 6/2006 | Scicluna | 190/110 |
| 2007/0272819 | A1 | * | 11/2007 | Wang | 248/476 |
| 2012/0286008 | A1 | * | 11/2012 | Ackeret et al. | 224/275 |

* cited by examiner

*Primary Examiner* — Joshua Rodden
*Assistant Examiner* — Kimberley S Wright
(74) *Attorney, Agent, or Firm* — Bacon & Thomas, PLLC

(57) ABSTRACT

A hook for clothes hanger has a first direction, a main body, a pressing unit and a resilient element. When in use, a hook segment of a clothes hanger is pushed to abut a slope of a blocking segment of the pressing unit, thereby moving the pressing unit along a direction opposite to the first direction. Thus, the hook segment of the clothes hanger can enter the hook. Afterwards, the resilient element pushes back the pressing unit along the first direction, such that the blocking segment is moved back to prevent the clothes hanger from falling off easily. To remove the clothes hanger, the pressing unit is directly pressed. As a result, the hook for clothes hanger does not need any specific operational effort for opening the hook, and only needs a simple press for closing the hook. Therefore, the operation is convenient and quick.

8 Claims, 8 Drawing Sheets

HOOK FOR CLOTHES HANGER

BACKGROUND OF THE INVENTION

1. Field of the Invention

The present invention relates to a hook for hanging a clothes hanger.

2. Description of the Prior Arts

A hook for clothes hanger is usually installed on a wall to hang up the clothes hanger, or is installed on an inner surface of a luggage to fix the clothes hanger.

With reference to FIGS. 7 and 8, a conventional hook for clothes hanger comprises a main body 91 and an engaging belt 92. The main body 91 has at least one hook unit 911 and an engaging segment 912. The engaging segment 912 is disposed in a bottom of the main body 91. The engaging belt 92 is a resilient belt, and has a top end and a through hole 921. The top end of the engaging belt 92 is mounted securely to the main body 91. The through hole 921 is disposed around the at least one hook unit 911 of the main body 91. A bottom edge of the through hole 921 upward engages the engaging segment 912 of the main body 91.

When in use, the engaging belt 92 does not engage with the engaging segment 912 of the main body 91. The clothes hanger 93 is hung on the hook unit 911 of the main body 91, and then the engaging belt 92 is pulled down to be deformed and extend downward until the through hole 921 of the engaging belt 92 is lengthy enough to be disposed around the engaging segment 912, which is on the bottom of the main body 91. Afterwards, the engaging belt 92 is released and recovered to the original length. Thus, the bottom edge of the through hole 921 abuts the engaging segment 912 upward to securely fix the engaging belt 92 on the main body 91. At this time, both sides of the through hole 921 abut a hook segment 931 of the clothes hanger 93, thereby fixing the clothes hanger 93 on the hook and preventing the clothes hanger 93 from falling off the hook easily. To remove the clothes hanger 93, the engaging belt 92 is pulled down until the engaging belt 92 departs from the engaging segment 912, and then the engaging belt 92 departs from the main body 91, and finally the clothes hanger 93 can be removed.

However, for both opening and closing the hook for clothes hanger as mentioned above, the user has to spend efforts pulling the engaging belt 92 to or away from a specific position (i.e. the engaging segment 912), which is not only inconvenient but also time-consuming in use.

To overcome the shortcomings, the present invention provides a hook for clothes hanger to mitigate or obviate the aforementioned problems.

SUMMARY OF THE INVENTION

The main objective of the present invention is to provide a hook for clothes hanger that is easy and convenient to be opened and closed.

The hook for clothes hanger has a first direction, a main body, a pressing unit and a resilient element. The first direction is vertical. The main body has an inner space, a first opening, and at least one body opening set. The first opening is disposed on an end of the main body that is in the first direction and communicates with the inner space. Each body opening set includes a first body opening and two side body openings. The first body opening is disposed on a front surface of the main body and communicates with the inner space. The side body openings are respectively disposed on two transverse surfaces of the main body and communicate with the inner space and the first body opening. The pressing unit is up-and-down moveably mounted in the main body, protrudes out of the first opening of the main body, and has at least one accommodating segment. Each accommodating segment corresponds to one of the at least one body opening set, and has an accommodating recess, a blocking segment and a front pressing opening. The accommodating recess is transversely formed through the pressing unit, and communicates with the side body openings of the corresponding body opening set. The blocking segment is disposed adjacent to and in front of the accommodating recess, is selectively disposed in an inner side of the first body opening of the corresponding body opening set, and has a slope. The slope is formed at a border between the front surface and an end of the blocking segment that is in the first direction. The front pressing opening is disposed adjacent to and in front of the accommodating recess, is disposed adjacent to the blocking segment in the first direction, and selectively communicates with the first body opening of the corresponding body opening set. The resilient element is mounted in the inner space of the main body, abuts between an inner surface of the main body and the pressing unit to push the pressing unit along the first direction to make each blocking segment of the pressing unit disposed in an inner side of the first body opening of the corresponding body opening set.

When in use, a hook segment of the clothes hanger is pushed to abut the slope of the blocking segment of the pressing unit, thereby moving the pressing unit along a direction opposite to the first direction. Thus, the front pressing opening communicates with the first body opening, and the hook segment of the clothes hanger can pass the front pressing opening and the first body opening to enter the side body openings and the accommodating recess. When the clothes hanger passes the pressing unit, the resilient element pushes back the pressing unit along the first direction, such that the blocking segment of the pressing unit is moved back to the inner side of the first body opening to prevent the clothes hanger from easily falling off from the hook. To remove the clothes hanger, the pressing unit is directly pressed to make the front pressing opening communicate with the first body opening. As a result, the hook for clothes hanger does not need any specific operational effort for opening the hook, and only needs a simple press for closing the hook. Therefore, the operation of the hook for clothes hanger is convenient and quick.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
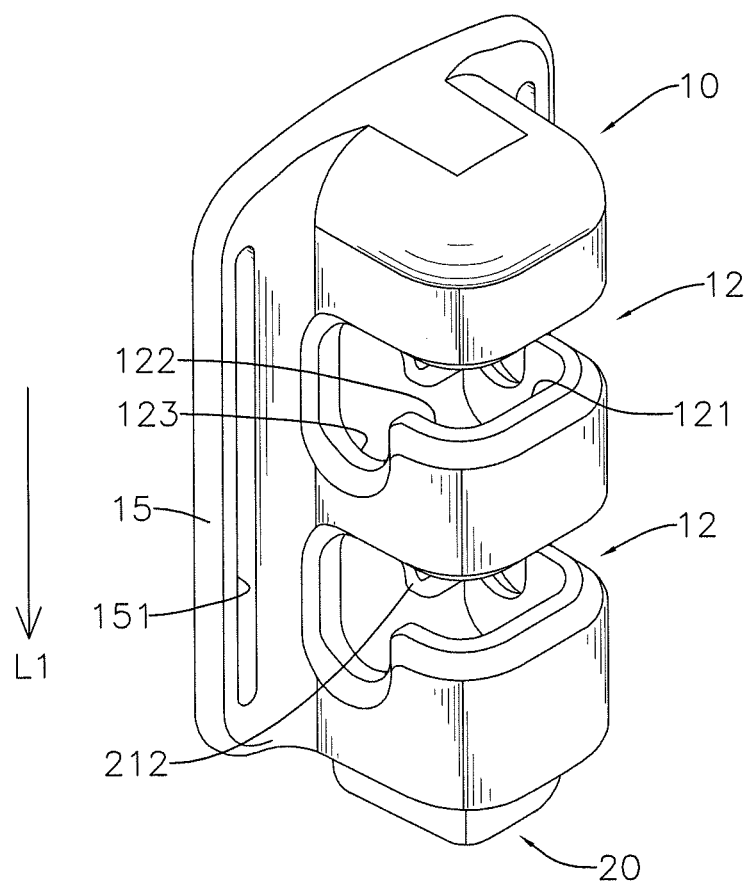
FIG. 1 is a perspective view of a hook for clothes hanger in accordance with the present invention.
Figure 2:
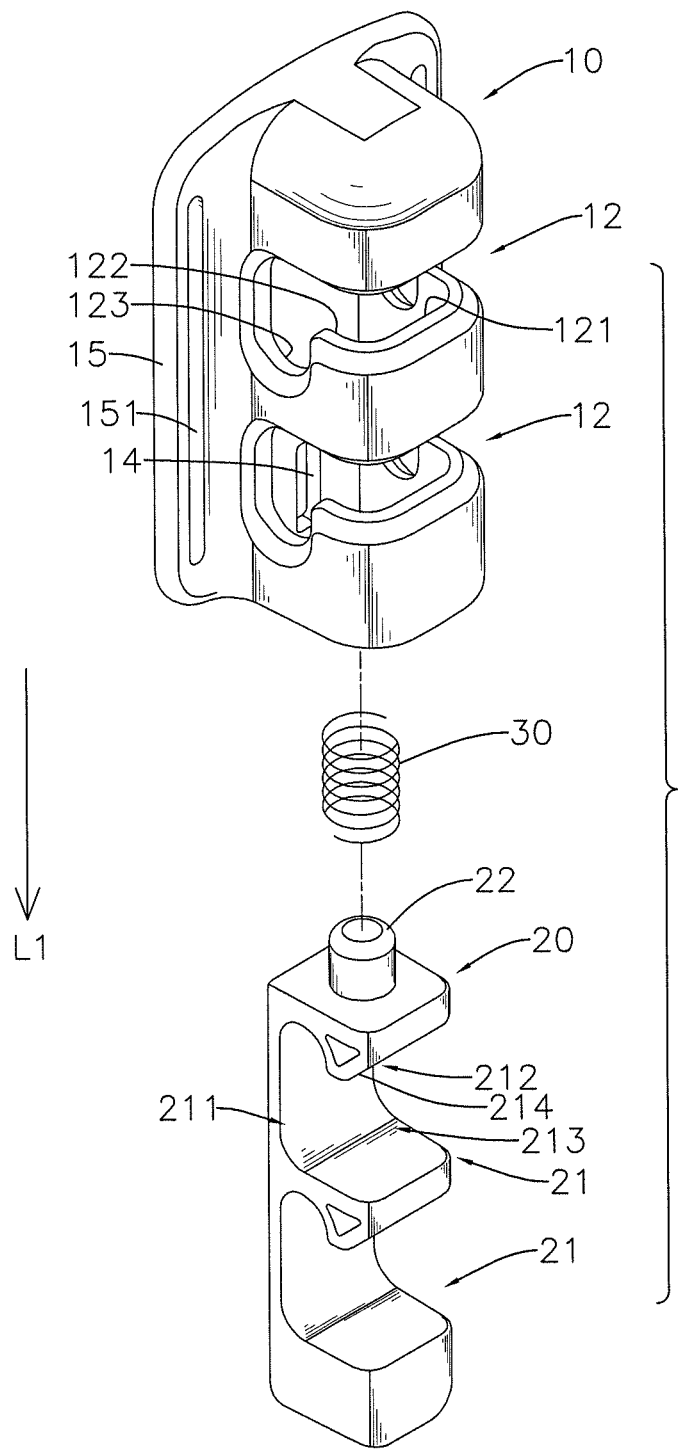
FIG. 2 is an exploded perspective view of the hook for clothes hanger in FIG. 1.

With reference to FIGS. 1 and 2, a hook for clothes hanger in accordance with the present invention comprises a main body 10, a pressing unit 20 and a resilient element 30. A vertical direction is defined as a first direction L1. The first direction L1 may be upward vertical or downward vertical, depending on actual use of the hook. In the embodiment of the drawings, the first direction L1 is downward vertical.

Figure 3:
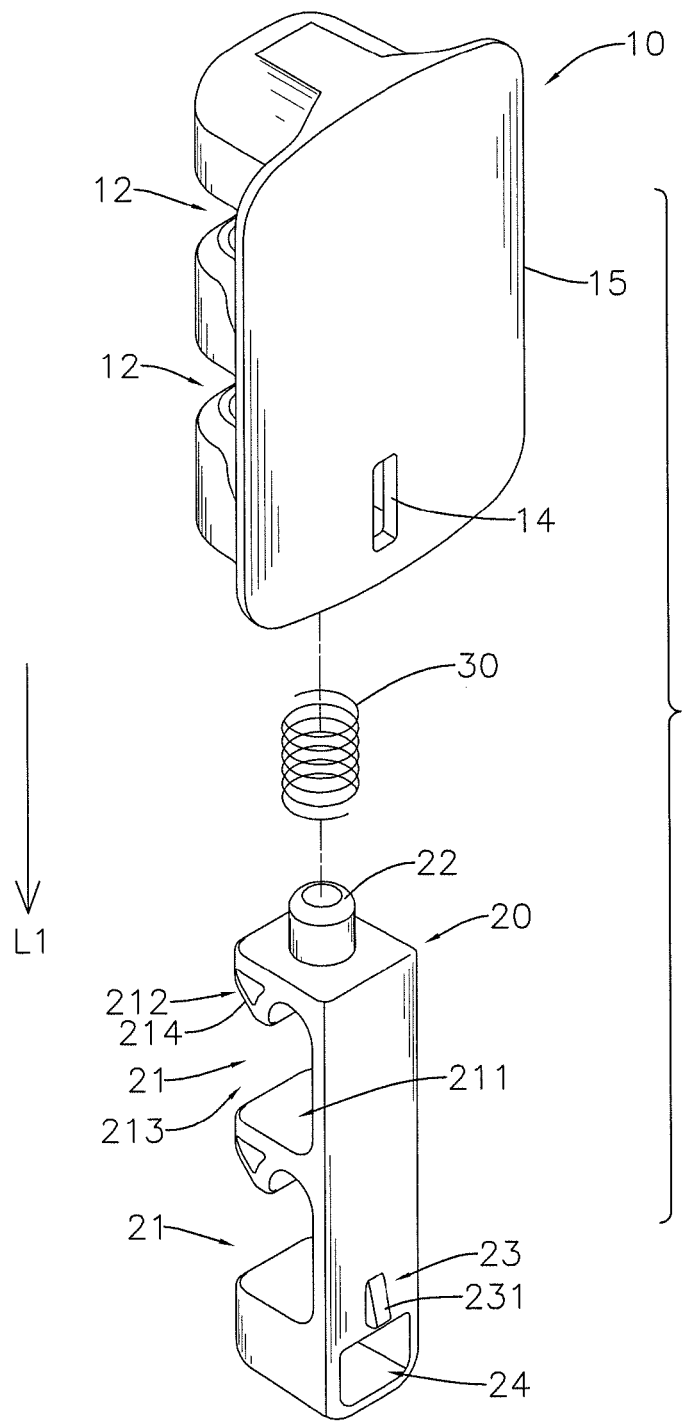
FIG. 3 is another exploded perspective view of the hook for clothes hanger in FIG. 1.
Figure 4:
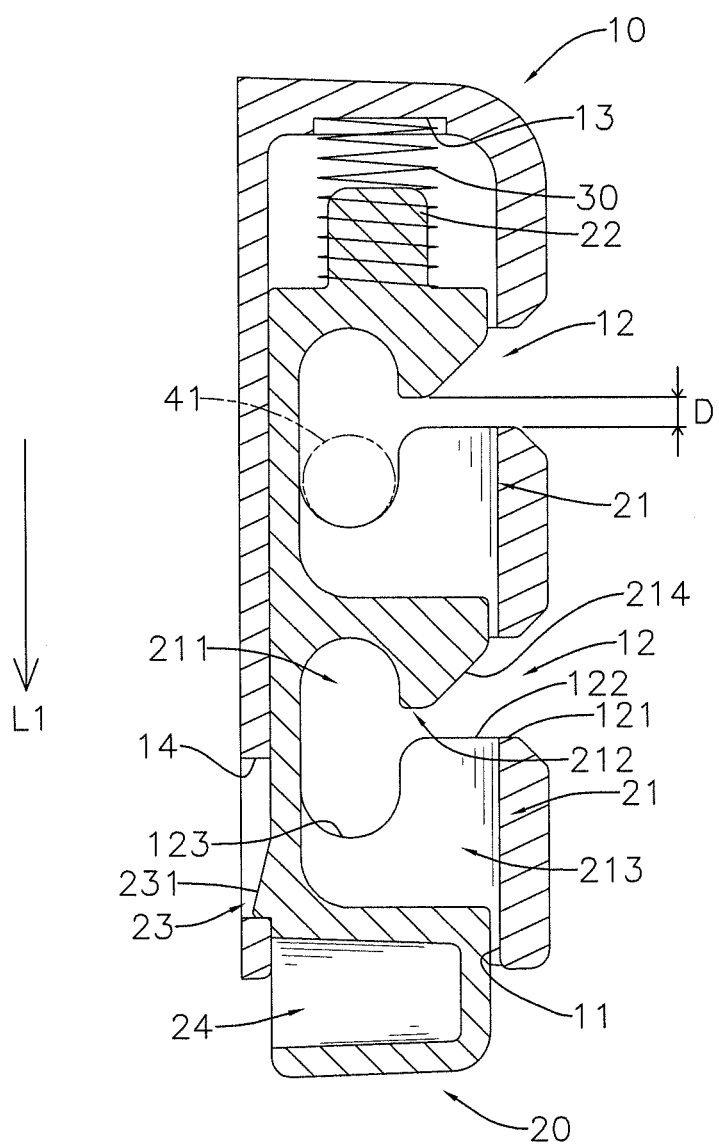
FIG. 4 is a side view in partial section of the hook for clothes hanger in FIG. 1, shown closed.
Figure 6:
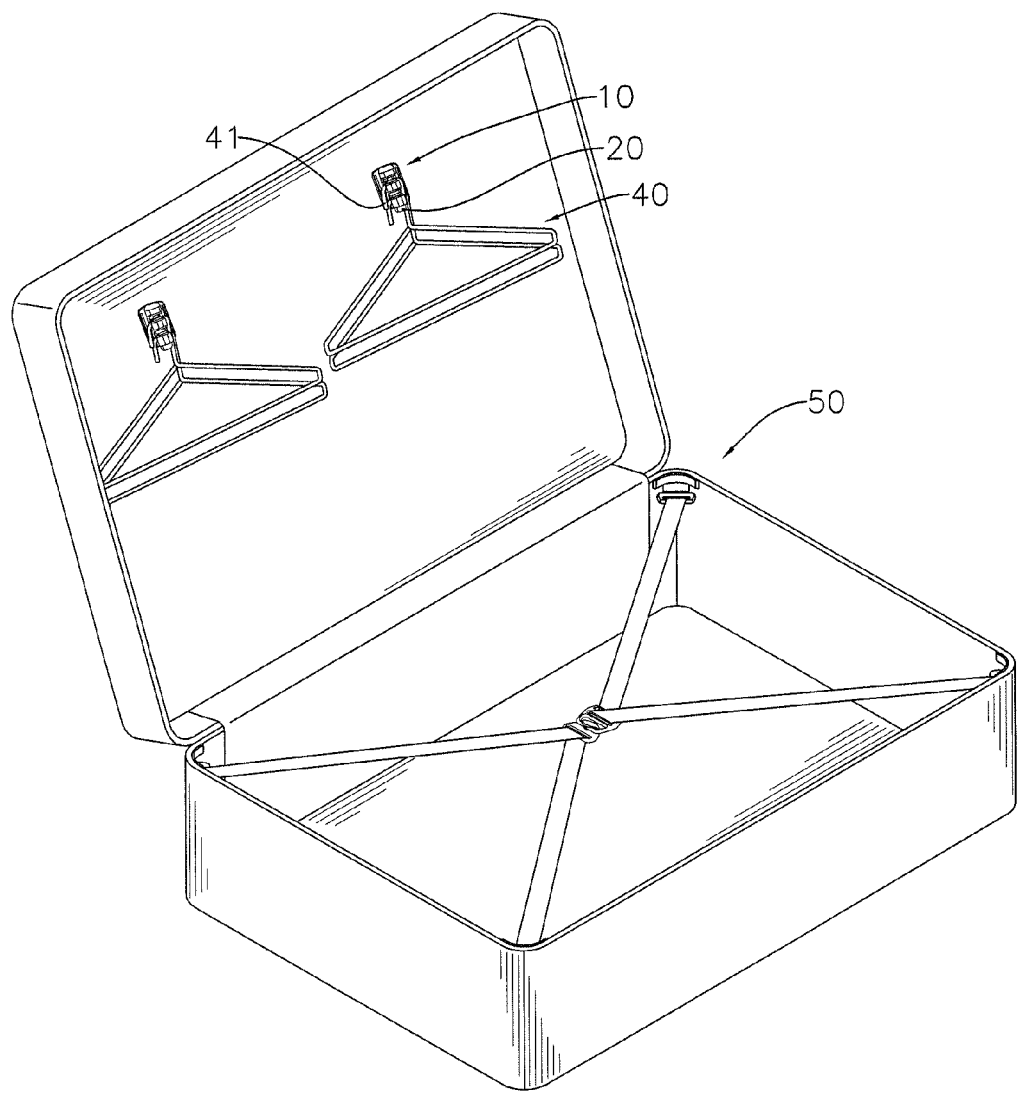
FIG. 6 is an operational perspective view of the hook for clothes hanger in FIG. 1, shown mounted on interior of a luggage.
Figure 7:
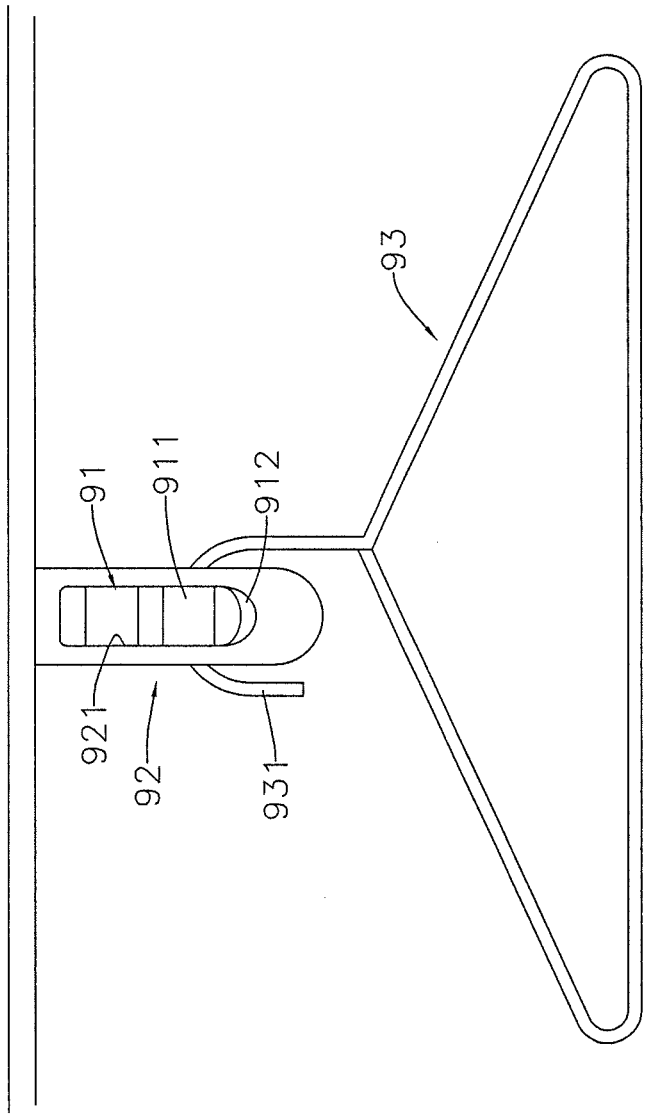
FIG. 7 is a front operational view of a conventional hook for clothes hanger in accordance with the prior art.
Figure 8:
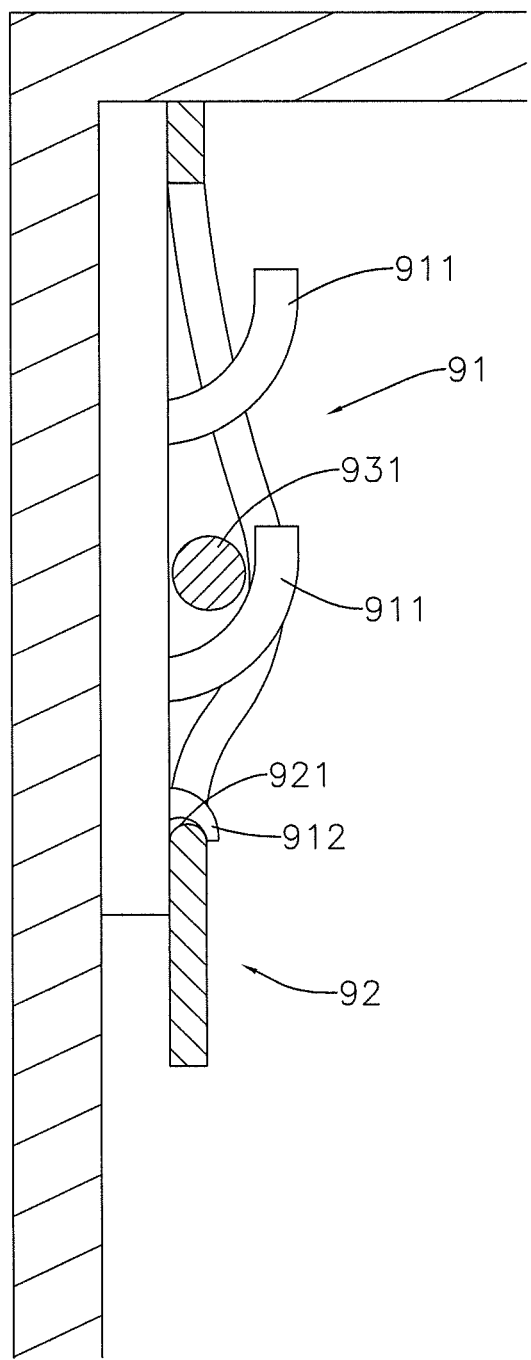
FIG. 8 is a side operational view of the conventional hook for clothes hanger in FIG. 7.

With reference to FIGS. 2 to 4, the main body 10 is substantially a square tube, and has an inner space, a first opening 11, at least one body opening set 12, a mounting recess 13, a limit recess 14 and two mounting panels 15. In a preferred embodiment, the main body 10 has two main body assemblies 12, and the main body assemblies 12 are vertically arranged apart from each other. The first opening 11 is disposed on an end of the main body 10 that is in the first direction L1 as shown in FIG. 4, and the first opening 11 communicates with the inner space. Each body opening set 12 includes a first body opening 121, two side body openings 122 and two engaging recesses 123. The first body opening 121 is disposed on a front surface of the main body 10 and communicates with the inner space. The side body openings 122 are respectively disposed on two transverse surfaces of the main body 10 and communicate with the inner space and the first body opening 121. The engaging recesses 123 are respectively formed in edges of the side body openings 122 that are in the first direction. The mounting recess 13 is formed in an inner surface of the main body 10 that is in a direction opposite to the first direction L1 as shown in FIG. 4. The limit recess 14 is formed through a back surface of the main body 10, and extends vertically. The mounting panels 15 are respectively formed on two transverse sides of the main body 10, and each mounting panel 15 has a sewing recess 151. The sewing recess 151 is formed in a front surface of the mounting panel 15, and extends vertically. When mounted on places such as interior of a luggage 50 as shown in FIG. 6, the hook for clothes hanger as mentioned above may be sewed on the luggage 50 via the sewing recess 151 since the mounting panel 15 is thinner at the position of the sewing recess 151. Further, the hook for clothes hanger is not only capable of being mounted on the luggage 50 but also can be mounted on a wall or other places.

The pressing unit 20 is up-and-down moveably mounted in the main body 10, protrudes out of the first opening 11 of the main body 10, and has at least one accommodating segment 21, a mounting protrusion 22, a limit protrusion 23 and a weight-reduction recess 24. In a preferred embodiment, the pressing unit 20 has two accommodating segments 21, and the accommodating segments 21 are vertically arranged apart from each other. The two accommodating segments 21 respectively correspond to the two main body assemblies 12 of the main body 10. Each accommodating segment 21 has an accommodating recess 211, a blocking segment 212 and a front pressing opening 213. The accommodating recess 211 is transversely formed through the pressing unit 21, and communicates with the side body openings 122 of the corresponding body opening set 12. The blocking segment 212 is disposed adjacent to and in front of the accommodating recess 211, is selectively disposed in an inner side of the first body opening 121 of the corresponding body opening set 12, and has a slope 214. The slope 214 is formed at a border between the front surface and an end of the blocking segment 212 that is in the first direction L1. The front pressing opening 213 is disposed adjacent to and in front of the accommodating recess 211, is disposed adjacent to the blocking segment 212 in the first direction L1, and selectively communicates with the first body opening 121 of the corresponding body opening set 12. The mounting protrusion 22 is formed on an end of the pressing unit 20 that is in a direction opposite to the first direction L1. The limit protrusion 23 is formed on a back surface of the pressing unit 20, is up-and-down movably mounted in the limit recess 14 of the main body 10, and has a slope 231. The slope 231 is formed in a back surface of the limit protrusion 23 and is disposed toward a direction opposite to the first direction L1. The slope 231 facilitates convenience in assembling the limit protrusion 23 into the limit recess 14 when the pressing unit 20 and the main body 10 are assembled. The weight-reduction recess 24 is formed in the back surface of the pressing unit 20, and is disposed in the first direction L1 relative to the accommodating segments 21 and the limit protrusion 23. The weight-reduction recess 24 can reduce the overall weight of the hook for clothes hanger.

The resilient element 30 is mounted in the inner space of the main body 10, abuts between the inner surface of the main body 10 and the pressing unit 20 to push the pressing unit 20 along the first direction L1 until the limit protrusion 23 of the pressing unit 20 abuts an edge of the limit recess 14 of the main body 10 that is in the first direction L1. At this time, each blocking segment 212 of the pressing unit 20 is disposed in the inner side of the first body opening 121 of the corresponding body opening set 12, and a gap is formed between an edge of the side body openings 122 of each body opening set 12 that is in the first direction L1 and an end of the blocking segment 212 of the corresponding accommodating segment 21 that is in the first direction L1. A height D of the gap is shown in FIG. 4. In a preferred embodiment, the resilient element 30 is a spring and has two ends. The ends of the resilient element 30 are respectively mounted in the mounting recess 13 of the main body 10 and mounted around the mounting protrusion 22 of the pressing unit 20.

Figure 5:
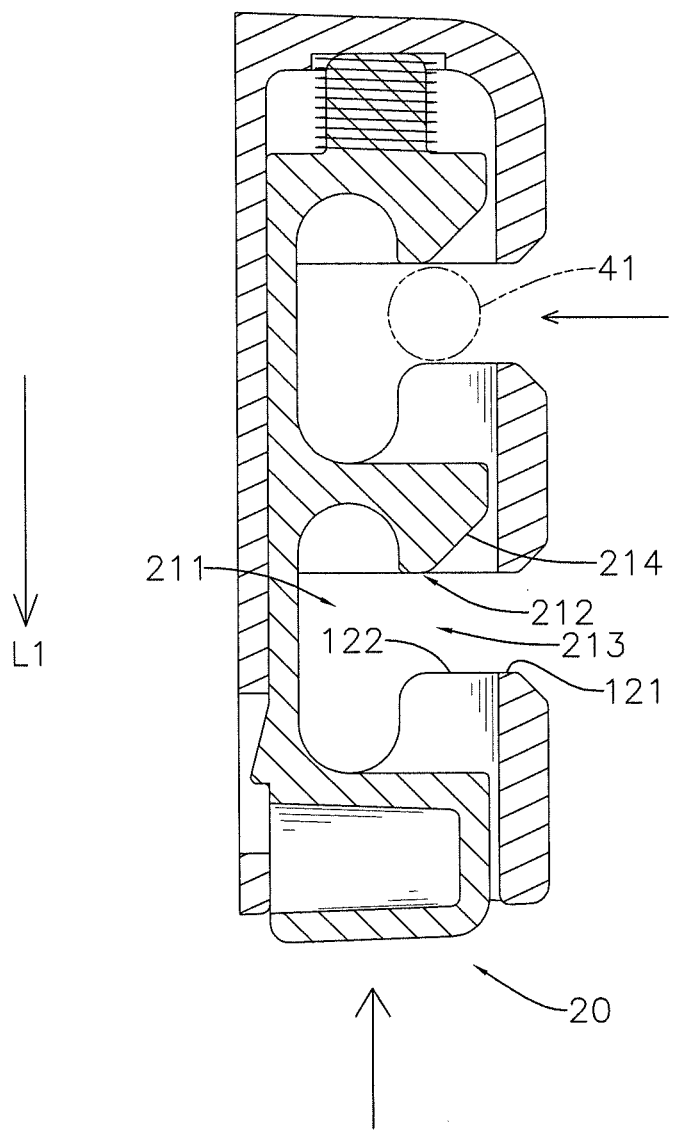
FIG. 5 is a side view in partial section of the hook for clothes hanger in FIG. 1, shown opened.

With reference to FIGS. 5 and 6, when in use, to put in the clothes hanger 40, a hook segment 41 of the clothes hanger 40 is pushed to abut the slope 214 of the blocking segment 212 of the pressing unit 20, thereby moving the pressing unit 20 along a direction opposite to the first direction L1. Thus, the front pressing opening 213 communicates with the first body opening 121, and the hook segment 41 of the clothes hanger 40 can pass the front pressing opening 213 and the first body opening 121 to enter the side body openings 122 and the accommodating recess 211. With reference to FIG. 4, when the clothes hanger 40 passes the pressing unit 20, the resilient element 30 pushes back the pressing unit 20 along the first direction L1, such that the blocking segment 212 of the pressing unit 20 is moved back to the inner side of the first body opening 121 to prevent the clothes hanger 40 from easily falling off from the hook. In a preferred embodiment, when the first direction L1 is downward vertical as in the embodiment of the drawings, the hook segment 41 of the clothes hanger 40 may fall into the engaging recesses 123 that are disposed in the edges of the side body openings 122 to further fix the clothes hanger 40. During the movement mentioned above, since the gap, which has the height D, is formed between the edge of the side body openings 122 that is in the first direction L1 and the end of the blocking segment 212 of the pressing unit 20 that is in the first direction L1, an overall length of the slope 214 of the blocking segment 212 can be reduced, such that the blocking segment 212 is easy to be pushed and moved from the outer side of hook. In addition, besides being pressed by the clothes hanger 40, the pressing unit 20 also can be directly pressed by a user, which also makes the front pressing opening 213 communicate with the first body opening 121. With reference to FIG. 5, to remove the clothes hanger 40, the pressing unit 20 is directly pressed to make the front pressing opening 213 communicate with the first body opening 121. As a result, the hook for clothes hanger does not need any specific operational effort for opening the hook, and only needs a simple press for closing the hook. Therefore, the operation of the hook for clothes hanger is convenient and quick.

With reference to FIG. 5, in addition, regardless that the first direction L1 is upward vertical or downward vertical, which means regardless that the pressing unit 20 is disposed upward or downward when in use, the blocking segment 212 of the pressing unit 20 can block the inner side of the first body opening 121 to restrict the position of the hook segment 41 of the clothes hanger 40, and the operation is the same by pressing the pressing unit 20.

Moreover, the hook for clothes hanger has two main body assemblies 12, and the pressing unit 20 has two accommodating segments 21, such that the hook for clothes hanger can be used for hanging two clothes hangers 40. The amounts of the main body assemblies 12 and the accommodating segments 21 are by no means limited to the abovementioned, and may respectively be one, three or more, as long as the amount of the body opening set 12 is equal to the amount of the accommodating segment 21. Then the hook for clothes hanger can be used for clothes hanger 40 of the same amount.

In another preferred embodiment, the body opening set also can have no engaging recess, and the hook segment of the clothes hanger is disposed in the side body opening. Since the hook for clothes hanger prevents the clothes hanger from falling off by disposing the blocking segment of the pressing unit in the inner side of the first body opening, in design of the hook, sizes of the side body opening and the accommodating recess are not restricted to a shape of the hook segment of the clothes hanger. Spaces of the side body opening and the accommodating recess can be enlarged to be adaptable to clothes hangers of different shapes and sizes.

In another preferred embodiment, when the resilient element pushes the pressing unit to the end of the movement route along the first direction, there may be no gap formed between the edge of the side body openings that is in the first direction and the end of the blocking segment that is in the first direction. In other words, at this time, the blocking segment of the pressing unit fully blocks the first body opening of the main body.

In another preferred embodiment, the limit recess may be formed in the back surface of the pressing unit, and the limit protrusion may be formed on the back surface of the main body, which also can limit a movement route of the pressing unit, and avoid a deviation of the movement of the pressing unit.

In another preferred embodiment, the resilient element also can be an element other than a spring, as long as the resilient element can push the pressing unit along the first direction.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hook for clothes hanger, the hook comprising:
   a first direction being vertical;
   a main body having
   an inner space;
   a first opening disposed on an end of the main body that is in the first direction and communicating with the inner space;
   at least one body opening set, and each body opening set including
   a first body opening disposed on a front surface of the main body and communicating with the inner space; and
   two side body openings respectively disposed on two transverse surfaces of the main body and communicating with the inner space and the first body opening; and
   a mounting recess formed in an inner surface of the main body in a direction opposite to the first direction;
   a pressing unit up-and-down moveably mounted in the main body, protruding out of the first opening of the main body, and having
   at least one accommodating segment; each accommodating segment corresponding to one of the at least one body opening set, and having
   an accommodating recess transversely formed through the pressing unit, and communicating with the side body openings of the corresponding body opening set;
   a blocking segment disposed adjacent to and in front of the accommodating recess, selectively disposed in an inner side of the first body opening of the corresponding body opening set, and having
   a slope formed at a border between the front surface and an end of the blocking segment that is in the first direction; and
   a front pressing opening disposed adjacent to and in front of the accommodating recess, disposed adjacent to the blocking segment in the first direction, and selectively communicating with the first body opening of the corresponding body opening set;
   a mounting protrusion formed on an end of the pressing unit in a direction opposite to the first direction; and
   a resilient element mounted in the inner space of the main body, abutting between the inner surface of the main body and the pressing unit to push the pressing unit along the first direction to make each blocking segment of the pressing unit disposed in an inner side of the first body opening of the corresponding body opening set, being a spring, and having
   two ends respectively mounted in the mounting recess of the main body and mounted around the mounting protrusion of the pressing unit.

2. The hook for clothes hanger as claimed in claim 1, wherein
   the main body further has
   a limit recess formed through a back surface of the main body, and extending vertically;
   the pressing unit further has
   a limit protrusion formed on a back surface of the pressing unit, and up-and-down movably mounted in the limit recess of the main body; and
   wherein when the limit protrusion abuts an edge of the limit recess that is in the first direction, the blocking segment of the pressing unit is disposed in the inner side of the first body opening of the corresponding body opening set of the main body.

3. The hook for clothes hanger as claimed in claim 2, wherein the limit protrusion of the pressing unit further has
   a slope formed in a back surface of the limit protrusion and disposed toward a direction opposite to the first direction.

4. The hook for clothes hanger as claimed in claim 1, wherein the main body further has
   two mounting panels respectively formed on two transverse sides of the main body, and each mounting panel having
   a sewing recess formed in a front surface of the mounting panel, and extending vertically.

5. The hook for clothes hanger as claimed in claim 1, wherein the pressing unit further has
   a weight-reduction recess formed in a back surface of the pressing unit, and disposed in the first direction relative to the accommodating segment.

6. The hook for clothes hanger as claimed in claim 1, wherein when the resilient element pushes the pressing unit along the first direction and the blocking segment of the pressing unit is disposed in the inner side of the first body opening of the corresponding body opening set, a gap is formed between an edge of the side body openings of each body opening set that is in the first direction and an end of the blocking segment of the corresponding accommodating segment that is in the first direction.

7. The hook for clothes hanger as claimed in claim 1, wherein each body opening set of the main body further has
   two engaging recesses respectively formed in edges of the side body openings that are in the first direction.

8. The hook for clothes hanger as claimed in claim 1, wherein
   the main body has multiple main body assemblies vertically arranged apart from each other; and
   the pressing unit has multiple accommodating segments vertically arranged apart from each other.

\* \* \* \* \*